United States Patent
Noh et al.

(10) Patent No.: US 7,611,794 B2
(45) Date of Patent: Nov. 3, 2009

(54) WATER CONTROLLER SYSTEM FOR DIRECT METHANOL FUEL CELL

(75) Inventors: Taegeun Noh, Seoul (KR); Goyoung Moon, Seoul (KR); Sanghyun Lee, Daejeon (KR)

(73) Assignee: LG Chem, Ltd. (KR)

( * ) Notice: Subject to any disclaimer, the term of this patent is extended or adjusted under 35 U.S.C. 154(b) by 535 days.

(21) Appl. No.: 11/538,188

(22) Filed: Oct. 3, 2006

(65) Prior Publication Data

US 2007/0264553 A1 Nov. 15, 2007

(30) Foreign Application Priority Data

Nov. 15, 2005 (KR) .................. 10-2005-0108845

(51) Int. Cl.
*H01M 8/04* (2006.01)

(52) U.S. Cl. ................ 429/34; 96/326; 96/355; 96/361; 96/423; 261/109; 261/110; 261/114.1; 261/114.2; 261/114.5; 261/126

(58) Field of Classification Search .......... 96/276, 96/278, 361, 363, 364, 355; 261/108–114.5, 261/148; 202/190
See application file for complete search history.

(56) References Cited

U.S. PATENT DOCUMENTS

| | | | | | |
|---|---|---|---|---|---|
| 2,398,953 | A | * | 4/1946 | O'Brien | 261/114.2 |
| 2,522,425 | A | * | 9/1950 | Baumann | 261/114.2 |
| 2,823,760 | A | * | 2/1958 | Andersen | 55/313 |
| 3,095,923 | A | * | 7/1963 | Foutz | 165/164 |
| 3,322,136 | A | * | 5/1967 | Matta | 137/115.04 |
| 4,008,729 | A | * | 2/1977 | Chizinsky | 134/107 |
| 4,510,023 | A | * | 4/1985 | Bennett et al. | 203/99 |
| 4,872,955 | A | * | 10/1989 | Parker et al. | 202/154 |
| 5,185,017 | A | * | 2/1993 | Tanigawa et al. | 96/356 |

FOREIGN PATENT DOCUMENTS

| | | |
|---|---|---|
| JP | 04-229958 | 8/1992 |
| JP | 2004-186151 | 7/2004 |

\* cited by examiner

*Primary Examiner*—Jerry Lorengo
*Assistant Examiner*—Jared Wood
(74) *Attorney, Agent, or Firm*—Cantor Colburn LLP

(57) ABSTRACT

Disclosed herein is a direct methanol fuel cell system. More particularly, the present invention provides a water controller system constructed such that water generated from a cathode of the direct methanol fuel cell system and carbon dioxide and an unreacted methanol solution generated from an anode of the direct methanol fuel cell system are introduced into the water controller system, the carbon dioxide is discharged out of the water controller system, and the methanol solution is circulated to the corresponding electrode so as to reuse the methanol solution, and a fuel cell system including the water controller system. The water controller system for fuel cells according to the present invention has the effects of reusing water and an unreacted methanol solution discharged from the fuel cell, minimizing the amount of methanol evaporated and discharged, and accurately controlling the water level of the water controller.

12 Claims, 6 Drawing Sheets

WATER CONTROLLER SYSTEM FOR DIRECT METHANOL FUEL CELL

FIELD OF THE INVENTION

The present invention relates to a direct methanol fuel cell, and, more particularly, to a water controller system constructed such that water generated from a cathode of the direct methanol fuel cell system and carbon dioxide and an unreacted methanol solution generated from an anode of the direct methanol fuel cell system are introduced into the water controller system, the carbon dioxide is discharged out of the water controller system, and the methanol solution is circulated to the corresponding electrode so as to reuse the methanol solution, and a fuel cell system including the water controller system.

BACKGROUND OF THE INVENTION

A fuel cell is a novel electric power production system that directly converts chemical energy generated by the electrochemical reaction between fuel (hydrogen or methanol) and an oxidizing agent (oxygen or air) into electrical energy. The fuel cell has attracted considerable attention as a next-generation energy source by virtue of the high energy efficiency and the low contaminant discharge, i.e., the environmental friendly characteristics.

Based on the kinds of electrolytes used, fuel cells are classified into a phosphoric acid fuel cell, an alkaline fuel cell, a polymer electrolyte fuel cell, a molten carbonate fuel cell, and a solid oxide fuel cell. Among them, the proton exchange membrane fuel cell is classified as a proton exchange membrane fuel cell using hydrogen gas as fuel or a direct methanol fuel cell in which liquid-phase methanol, as direct fuel, is supplied to an anode.

The polymer electrolyte fuel cell is in the spotlight as a portable power supply unit, a power supply unit for vehicles, or a power supply unit for home use by virtue of low operating temperature of 100° C. or less, elimination of leakage problems due to the use of a solid electrolyte, rapid starting and response characteristics, and excellent durability. Especially, the direct methanol fuel cell has a simple fuel supply system, and the overall structure of the direct methanol fuel cell is not complicated as compared to other fuel cells. Furthermore, the miniaturization of the direct methanol fuel cell is possible. Consequently, research on the direct methanol fuel cell as a portable fuel cell is in progress.

Generally, a unit cell of the fuel cell is constructed in a structure in which an anode and a cathode are applied to opposite sides of an electrolyte membrane made of a polymer material. A methanol solution, as fuel, is supplied to the anode, and air, including oxygen, is supplied to the cathode. Hydrogen ions and electrons are generated from the anode as the result of the oxidation reaction of the methanol. The hydrogen ions move to the cathode through the polymer electrolyte, and reduction reaction occurs between the hydrogen ions and the oxygen. As the result of the reduction reaction, pure water is produced. By the above-described reactions, the electrons move to the cathode via an external circuit with the result that electric power is produced from the fuel cell. At this time, a large amount of carbon dioxide and an unreacted methanol solution are discharged from the anode. The water, the carbon dioxide, and the unreacted methanol generated during the power production of the fuel cell are discharged and recirculated through an additional water controller system.

FIG. 1 is a typical view of a conventional fuel cell system illustrating flow of materials supplied to and generated from a fuel cell.

Referring to FIG. 1, the fuel cell system 100 includes a fuel cell 110, a water controller system 120, and a heat exchanger 130. When electric power is produced using the fuel cell 110, water and carbon dioxide generated from a cathode 111 are introduced into the water controller system 120, and an unreacted methanol solution is introduced into the water controller system 120 from an anode 112. At this time, the water is condensed and collected in the heat exchanger 130 in the form of vapor, and is then introduced into the water controller system 120. The carbon dioxide is discharged through an outlet port 140 of the water controller system 120. The unreacted methanol solution and the water are recirculated to the fuel cell 110 by a liquid pump 150. However, some of the methanol solution gathered in the water controller system 120 is evaporated, and is then discharged through the outlet port 140, which is provided for eliminating the carbon dioxide gas.

Consequently, it is necessary to provide a method of preventing environmental pollution caused due to the discharge of methanol and supplementing the loss of fuel. For example, Japanese Unexamined Patent Publication No. 4-229958 discloses a water controller system constructed in a structure in which unreacted methanol and carbon dioxide are introduced into the lower part of a liquid separator, and the introduced methanol is condensed by a cooling plate disposed at the upper part of the liquid separator, whereby the condensed methanol is collected. In this conventional structure, however, the cooling plate, which condenses the methanol, is needed. Furthermore, an additional device for maintaining the cooling plate at a predetermined temperature or less is needed, and electric power for operating the additional device is also needed.

Also, Japanese Unexamined Patent Publication No. 20044-186151 discloses a water controller system constructed in a structure in which a liquid absorbing member is mounted in the system, which has a hollow part defined in the middle thereof, one end of a gas discharge pipe is located at the liquid absorbing member, and the other end of the gas discharge pipe, which has a liquid separating membrane mounted therein, is located at the hollow part. In this conventional structure, however, there is a strong possibility that the methanol is discharged through the gas discharge pipe, the end of which is located at the liquid absorbing member. Furthermore, the efficiency of the liquid separating membrane is lowered due to continuous use of the water controller system, and therefore, the liquid separation rate is decreased.

SUMMARY OF THE INVENTION

Therefore, the present invention has been made to solve the above-mentioned problems, and other technical problems that have yet to be resolved.

Specifically, it is an object of the present invention to provide a water controller system that is capable of reusing water and an unreacted methanol solution discharged from a fuel cell, minimizing the amount of methanol evaporated and discharged, and accurately controlling the water level of the water controller.

It is another object of the present invention to provide a fuel cell system including the water controller system.

In accordance with one aspect of the present invention, the above and other objects can be accomplished by the provision of a water controller system constructed such that water generated from a cathode of a direct methanol fuel cell system and carbon dioxide and an unreacted methanol solution generated from an anode of the direct methanol fuel cell system are introduced into the water controller system, the carbon dioxide is discharged out of the water controller system, and the methanol solution is circulated to the corresponding electrode so as to reuse the methanol solution, wherein water controller system comprises: a water inlet port, through which the water from the cathode is introduced into the water controller system, mounted at the upper part of the water controller system; a gas/solution inlet port, through which the carbon dioxide and the unreacted methanol solution generated from the anode are introduced into the water controller system, mounted below the water inlet port; a carbon dioxide outlet port mounted above the water inlet port; and at least one methanol collecting unit, which is constructed such that, when a gas-phase ingredient, among ingredients introduced into the water controller system through the gas/solution inlet port, moves upward, the gas-phase ingredient passes through the water introduced into the water controller system through the water inlet port, mounted in a space defined between the water inlet port and the gas/solution inlet port, whereby the gas-phase methanol is prevented from being discharged out of the water controller system through the carbon dioxide outlet port.

Consequently, the gas-phase ingredient of the carbon dioxide and the unreacted methanol solution introduced into the water controller system through the gas/solution inlet port, especially, the evaporated methanol, moves upward while the evaporated methanol passes through the water introduced into the water controller system through the water inlet port. As a result, only the water-insoluble ingredient, i.e., the carbon dioxide, is discharged out of the water controller system, whereby the discharge of the methanol is largely prevented.

In a preferred embodiment, the methanol collecting unit may comprise: a upper open type water sump mounted to one side of the inner wall of the water controller system; and a partition extending from the other side of the inner wall of the water controller system to the inside of the water sump while the partition seals the inner space of the water controller system, one end of the partition, which extends to the inside of the water sump, being submerged in water filled in the water sump.

Preferably, the methanol collecting unit may comprise two or more methanol collecting units which are disposed in an alternating orientation structure. For example, the methanol collecting unit may be constructed such that the end of a first partition, which extends from right under the water inlet port, extends to a first water sump mounted to a side B facing a side A, at which the water inlet port is located, and the end of a second partition, which extends from right under the first water sump, extends to a second water sump mounted to the side A.

Preferably, the partition may be inclined toward the water sump such that water can flow along the upper surface of the partition and be collected in the water sump.

According to circumstances, one or more bubble caps may be mounted at the partition. Each of the bubble caps is a structure for allowing gas rising from below to continuously rise only when the gas passes through the liquid-phase ingredient gathered around each of the bubble caps in the shape of bubbles.

Preferably, each of the bubble caps comprises: a hollow member extending upward through the partition; and a cap member mounted to the upper part of the hollow member. The cap member may have a sectional area greater than that of the hollow member such that a gap is defined between the hollow member and the cap member, while the hollow member and the cap member are not in contact with each other, when the cap member is mounted to the upper part of the hollow member.

In a preferred embodiment, each of the bubble caps may be constructed such that a plurality of grooves are formed at the upper end of the hollow member, and/or a plurality of grooves are formed at the lower end of the cap member.

In the case that the plurality of grooves are formed at the upper end of the hollow member, it is preferable that the hollow member have a sufficient height such that the upper end of the cap member be in contact with the upper end of the hollow member except for the grooves, and the lower end of the cap member is submerged in the water filled to a predetermined water level at the outside of the hollow member while the lower end of the cap member is not in contact with the upper surface of the partition.

In the case that the plurality of grooves are formed at the lower end of the cap member, it is preferable that the cap member have a height greater than that of the hollow member such that the upper end of the cap member is not in contact with the upper end of the hollow member, and the lower end of the cap member extends to the partition.

In the case that the bubble caps are mounted to the partition, it is preferable that the partition be horizontally disposed, and an upward extension be formed at one end of the partition, for example, such that water can be filled to the predetermined water level at the outside of the hollow member.

The hollow member and the cap member may be constructed in the horizontal sectional shape of a circle, a rectangle, or an ellipse. Also, the plurality of grooves formed at the hollow member and the cap member may be constructed in the shape of a circle, a rectangle, or an ellipse.

In a preferred embodiment, the carbon dioxide outlet port is mounted at the upper end of the water controller system, and the water controller system further comprises: a funnel-shaped condenser mounted below the carbon dioxide outlet port for condensing the evaporated water. At this time, it is preferable that the outlet port not be aligned with the inlet port of the condenser in a straight line.

Preferably, the condenser is provided at the lower end of a funnel-shaped inclined surface thereof, specifically, an inclined surface thereof facing the water inlet port, with a plurality of protrusions, which increase the contact interface area, whereby the condensing rate of the vapor among the vapor and the condensed water introduced into the water controller system through the water inlet port is increased. The protrusions may be formed in various shapes. For example, the protrusions may be formed in a minute needle shape, a minute plate shape, or a minute irregular shape.

Preferably, the water controller system may further comprise: a phase separating membrane mounted at an inlet port of the condenser for allowing only the gas-phase ingredient to pass therethrough, whereby only the gas-phase ingredient, such as carbon dioxide, is selectively transmitted through the phase separating membrane.

A mixed water and methanol solution stored in the water controller system must be maintained at a predetermined water level, and the mixed water and methanol solution is circulated to the electrode through the solution outlet port. The predetermined water level of the mixed water and methanol solution is controlled based on a water level signal detected by a water level sensor mounted in the lower part of the water controller system. On the other hand, it is difficult to accurately measure the water level of the mixed water and methanol solution due to the surge of the mixed water and methanol solution caused when a liquid-phase ingredient is introduced into the water controller system through the gas/ solution inlet port. Consequently, it is preferable that the water level sensor be mounted in a sealing unit constructed in a structure in which the sealing unit is generally sealed except openings formed at the upper and lower ends of the sealing unit, and the upper end opening protrudes from the mixed solution while the lower end opening is submerged in the mixed solution during the operation of the water controller system.

In accordance with another aspect of the present invention, there is provided a fuel cell system including the above-described water controller system. The fuel cell system including the above-described water controller system is well known as shown in FIG. 1, and therefore, the description of the fuel cell system will not be given.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
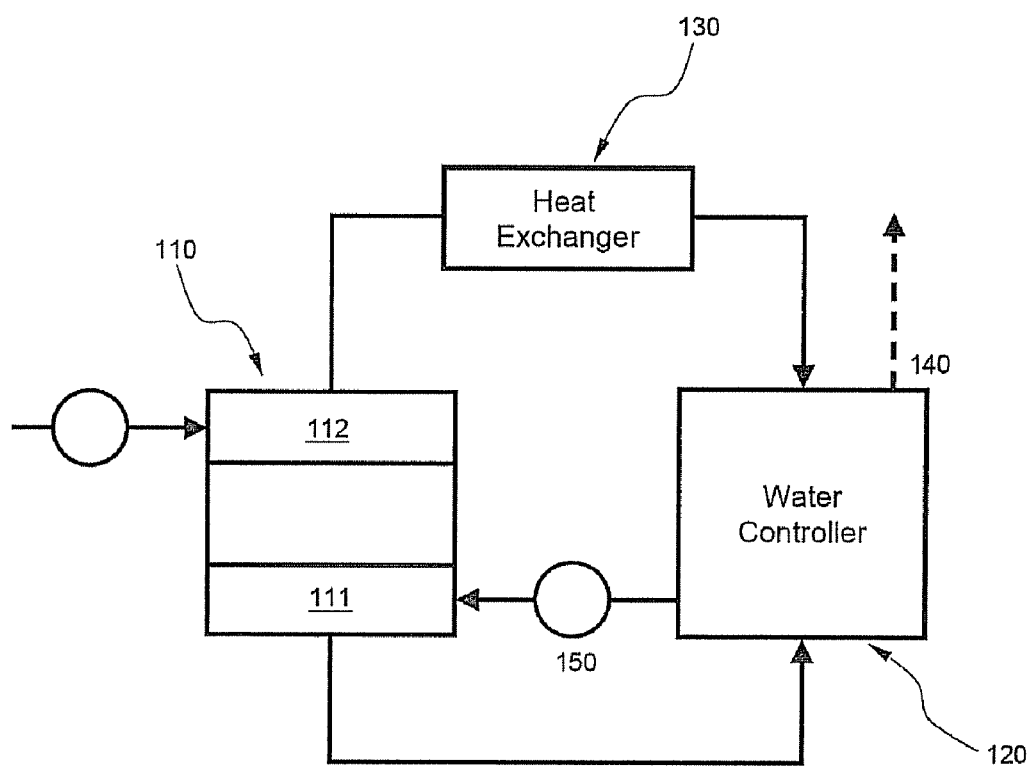
FIG. 1 is a typical view illustrating a conventional fuel cell system.
Figure 2:
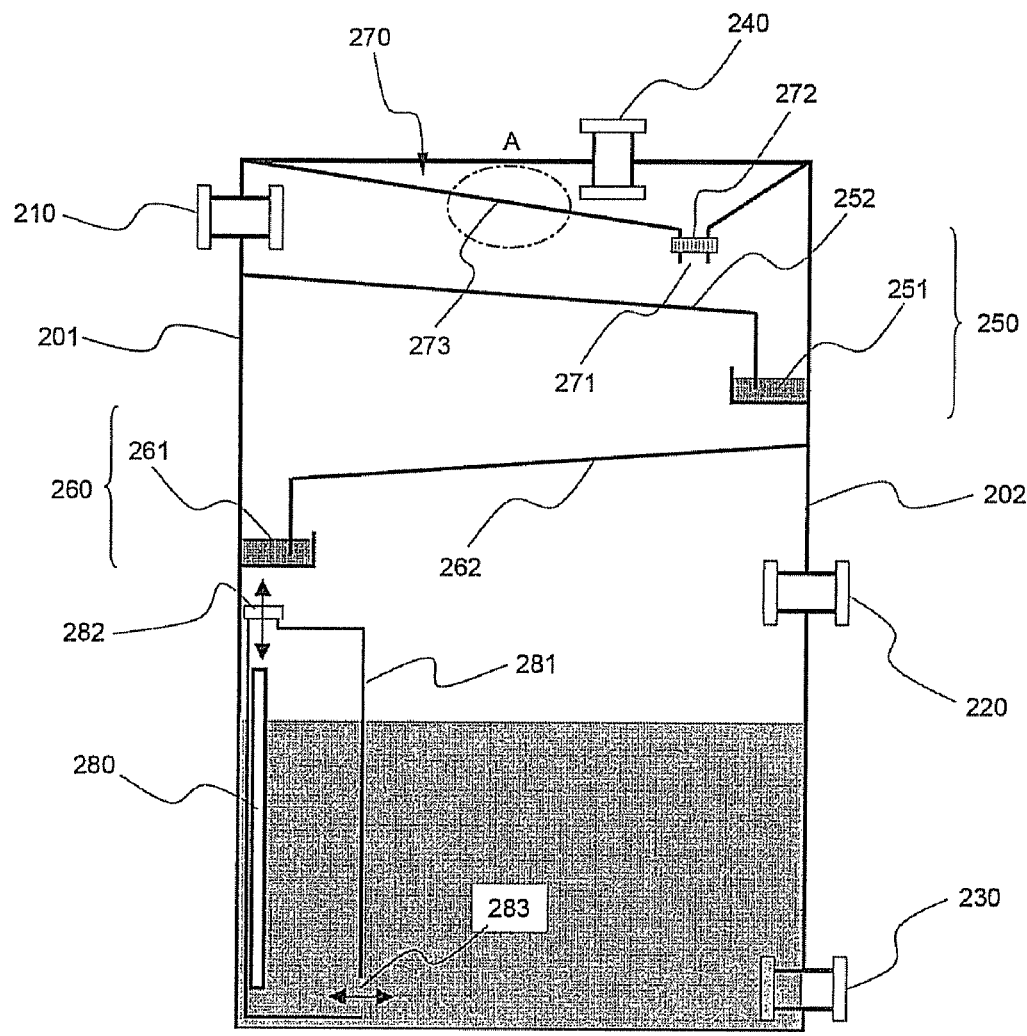
FIGS. 2 and 3 are a typical view and a partially enlarged view illustrating a water controller system according to a preferred embodiment of the present invention.

FIG. 2 is a typical view illustrating a water controller system according to a preferred embodiment of the present invention.

Referring to FIG. 2, the water controller system 200 is a system that recirculates an unreacted methanol solution introduced into the water controller system together with water and carbon dioxide generated from a fuel cell (not shown) to the fuel cell together with the water. Water generated from an anode (not shown) of the fuel cell is introduced into the water controller system 200 through a water inlet port 210, and carbon dioxide and an unreacted methanol solution discharged from a cathode (not shown) of the fuel cell are introduced into the water controller system 200 through a gas/solution inlet port 220.

The water inlet port 210 is formed at the upper part of the water controller system 200, and therefore, the water flows to the lower part of the water controller system 200. On the other hand, the gas/solution inlet port 220 is formed at the middle part of the water controller system 200, and therefore, the introduced carbon dioxide moves upward, and the unreacted methanol solution moves downward. The temperature of the unreacted methanol solution is high, and therefore, some of the unreacted methanol solution is evaporated and then moves upward together with the carbon dioxide. These gas-phase ingredients are discharged out of the water controller system 200 through an outlet port 240 only when the ingredients pass through a methanol collecting unit 250.

The methanol collecting unit 250 includes a water sump 251, in which water is filled, and a partition 252 inclined toward the water sump 251. The partition 252 is constructed to seal the interior of the water controller system 200 in the side direction thereof. One end of the partition 252 extends to the water sump 252 such that the end of the partition 252 is submerged in the water gathered in the water sump 252. Consequently, the gas-phase ingredients, including the unreacted methanol gas, moves to the outlet port 240 only after the gas-phase ingredients pass through the methanol collecting unit 250. At this time, a large amount of the unreacted methanol is absorbed by the water gathered in the water sump 251.

The methanol collecting unit 250 is mounted to a side wall 202 corresponding to a side wall 201, through which the water inlet port 210 is mounted. Another methanol collecting unit 260 is mounted to the side wall 202. Consequently, a partition 262 extends from the side wall 202 to a water sump 261.

The partitions 252 and 262 are inclined toward the water sumps 251 and 261, respectively, such that water located on the upper surfaces of the partitions 252 and 262 can flow into the water sumps 251 and 261. When the water gathered in the water sumps 251 and 261 exceeds a predetermined amount of water, the water overflows the water sumps 251 and 261, and then flows downward.

Below the carbon dioxide outlet port 240 is mounted a funnel-shaped condenser 270 where the water is condensed, and then drops onto the partition 252. An inlet port 271 of the condenser is not aligned with the outlet port 240 in a straight line, whereby the direct discharge of the condensed water is maximally prevented. At the inlet port 271 of the condenser is mounted a phase separating membrane 272 for allowing only the gas-phase ingredients to pass therethrough. As a result, only the gas-phase ingredient, such as carbon dioxide, is selectively transmitted through the phase separating membrane.

Figure 3:
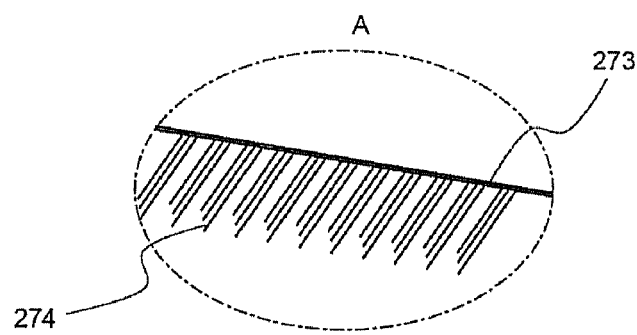

Meanwhile, most of the water generated from the cathode due to the exothermic reaction occurring at the time of operating the fuel cell is vapor. A large amount of the vapor is changed into water by a heat exchanger (not shown), and, when the water introduced into the water controller system through the water inlet port 210, the water contains vapor. Consequently, the condensation of the vapor by the condenser 270 reduces the driving force of the heat exchanger, for example, the driving force of a cooling fan, whereby the operation costs of the water controller system are reduced. In order to increase the condensing efficiency, the condenser 270 is provided at the lower end of the funnel-shaped inclined surface thereof, specifically, the inclined surface 273 thereof facing the water inlet port 210, with a plurality of minute needle-shaped protrusions 274, which increase the contact interface area, as shown in FIG. 3. The needle-shaped protrusions 274 increase the contact area of the vapor among the ingredients introduced into the water controller system through the water inlet port 210, thereby increasing the condensing efficiency.

Referring back to FIG. 2, a water level sensor 280 is mounted in the lower part of the water controller system 200 for measuring the water level of a mixed water and methanol solution in the water controller system to maintain the mixed water and methanol solution at a predetermined level and to move the mixed water and methanol solution through a solution outlet port 230 in the electrode direction. The water level sensor 280 is mounted in a sealing unit 281, by which the measuring error due to the surge of the mixed water and methanol solution caused when a liquid-phase ingredient is introduced into the water controller system through the gas/solution inlet port 220 is minimized. The sealing unit 281 is constructed in a structure in which the sealing unit 281 is generally sealed except openings 282 and 283 formed at the upper and lower ends of the sealing unit 281. The upper end opening 282 protrudes from the mixed solution, and the lower end opening 283 is submerged in the mixed solution. Consequently, the gas-phase ingredient flowing through the upper end opening 282 and the liquid-phase ingredient flowing through the lower end opening 283 influence the actual water level of the mixed solution in the sealing unit 281.

Figure 4:
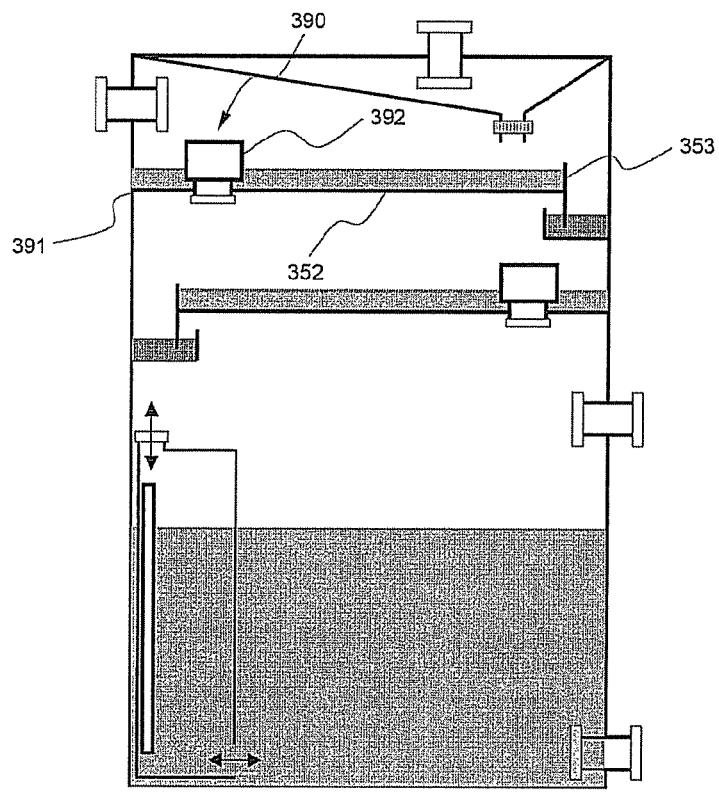
FIG. 4 is a typical view illustrating a water controller system according to another preferred embodiment of the present invention.

FIG. 4 is a typical view illustrating a water controller system according to another preferred embodiment of the present invention.

Referring to FIG. 4, the water controller system 300 includes a bubble cap 390 mounted on a partition 352 for further decreasing the amount of unreacted methanol discharged and reducing the internal pressure of the water controller system. The bubble cap 390 includes a hollow member 391, which extends upward through the partition 352, and a cap member 392 mounted to the upper part of the hollow member 391.

Also, the partition 352 is horizontally disposed such that water can be collected to a predetermined water level at the outside of the bubble cap 390. At one end of the partition is formed an upward extension 353 having a predetermined height.

Figure 5:
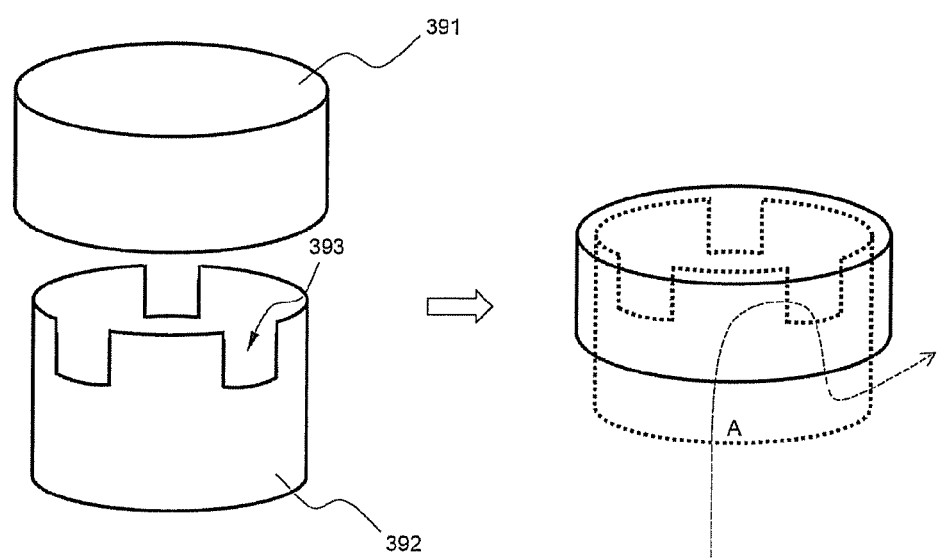
FIGS. 5 to 7 are perspective views illustrating various modifications of a bubble cap mounted in the water controller system shown in FIG. 4.
Figure 6:
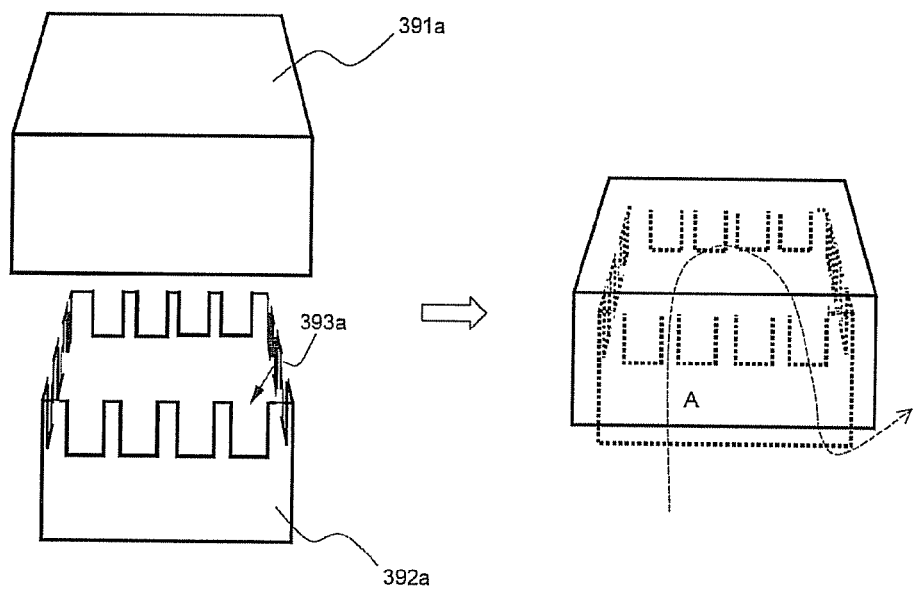
Figure 7:
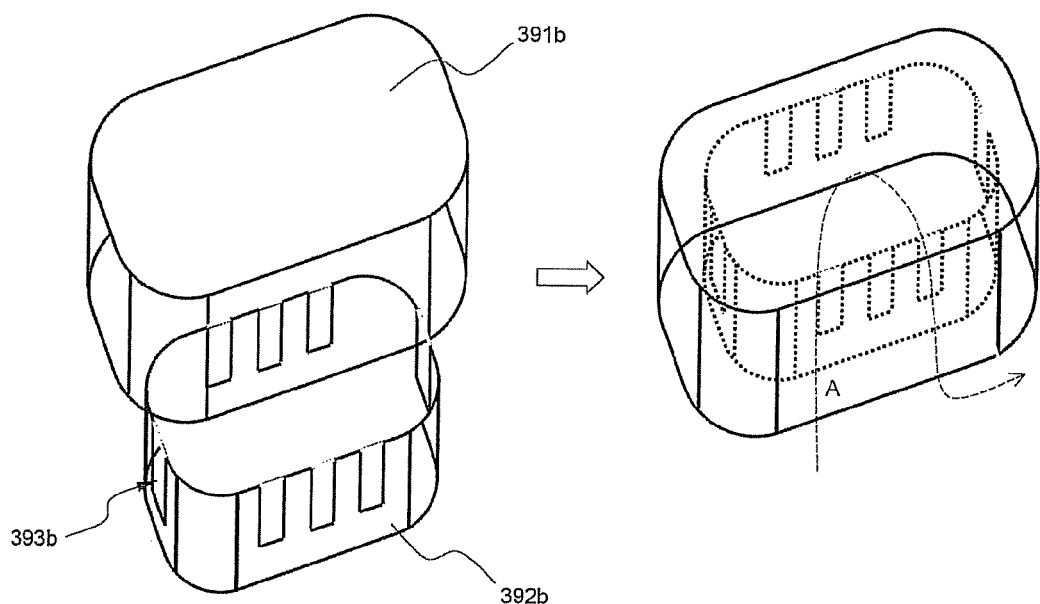

FIGS. 5 to 7 are perspective views illustrating various modifications of a bubble cap mounted in the water controller system shown in FIG. 4. Specifically, a circular bubble cap is shown in FIG. 5, a rectangular bubble cap is shown in FIG. 6, and an elliptical bubble cap is shown in FIG. 7.

Referring to these drawings, the bubble cap 390; 390a; 390b comprises a hollow member 391; 391a; 391b and a cap member 392; 392a; 392b. At the upper end of the hollow member 391; 391a; 391b are formed a plurality of grooves 393; 393a; 393b. The cap member 392; 392a; 392b, which covers the upper end of the hollow member 391; 391a; 391b, has a horizontal sectional area greater than that of the hollow member 391; 391a; 391b, but the length of the cap member 392; 392a; 392b is less than that of the hollow member 391; 391a; 391b. Consequently, when the cap member 392; 392a; 392b covers the upper end of the hollow member 391; 391 a; 391b, a gap is defined between the cap member 392; 392a; 392b and the hollow member 391; 391a; 391b.

In the above-described coupling structure, the upper end surface of the cap member 392; 392a; 392b is in contact with the upper end of the hollow member 391; 391a; 391b except for the grooves 393; 393a; 393b, and the lower end of the cap member 392; 392a; 392b is submerged in the water while the lower end of the cap member 392; 392a; 392b is not in contact with a partition (not shown). Consequently, unreacted methanol passes through the bubble cap 390 along a moving route A. Specifically, the unreacted methanol moves upward along the middle passage of the hollow member 391; 391a; 391b, and is discharged through the grooves 393; 393a; 393b of the hollow member 391; 391a; 391b and the gap defined between the cap member 392; 392a; 392b and the hollow member 391; 391a; 391b by the upper end surface of the cap member 392; 392a; 392b. As a result, when the unreacted methanol passes through the water in the bubble cap 390; 390a; 390b, most of the unreacted methanol is absorbed into the water, and only carbon dioxide passes through the bubble cap 390; 390a; 390b.

Figure 8:
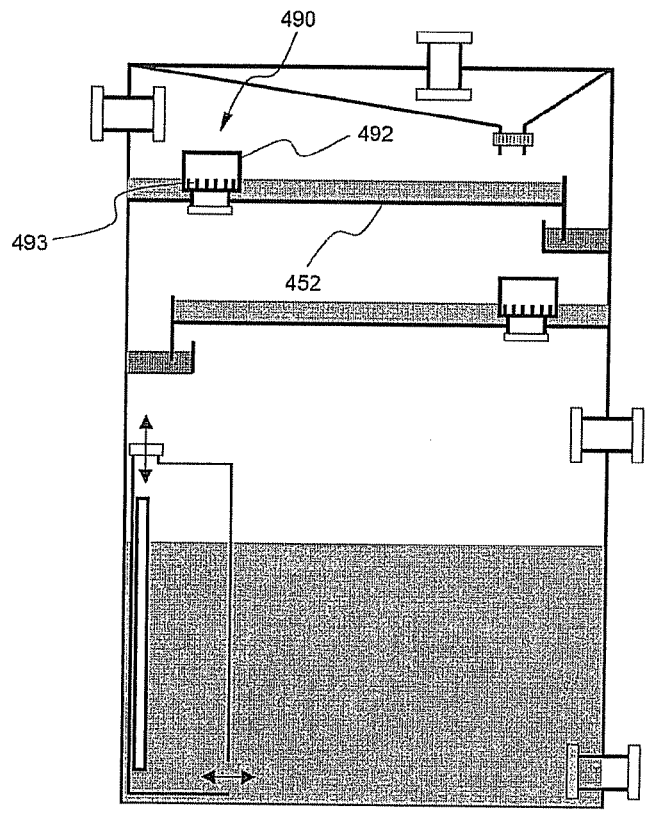
FIG. 8 is a typical view illustrating a water controller system according to yet another preferred embodiment of the present invention.

FIG. 8 is a typical view illustrating a water controller system according to yet another preferred embodiment of the present invention.

Referring to FIG. 8, the water controller system 400 is approximately identical in construction to the water controller system 300 shown in FIG. 4 except that a plurality of grooves 493 are formed at a cap member 492 of a bubble cap 490, and no grooves are formed at a hollow member of the bubble cap 490. The structure of the bubble cap 490 will be described below with reference to FIGS. 9 to 11.

Figure 9:
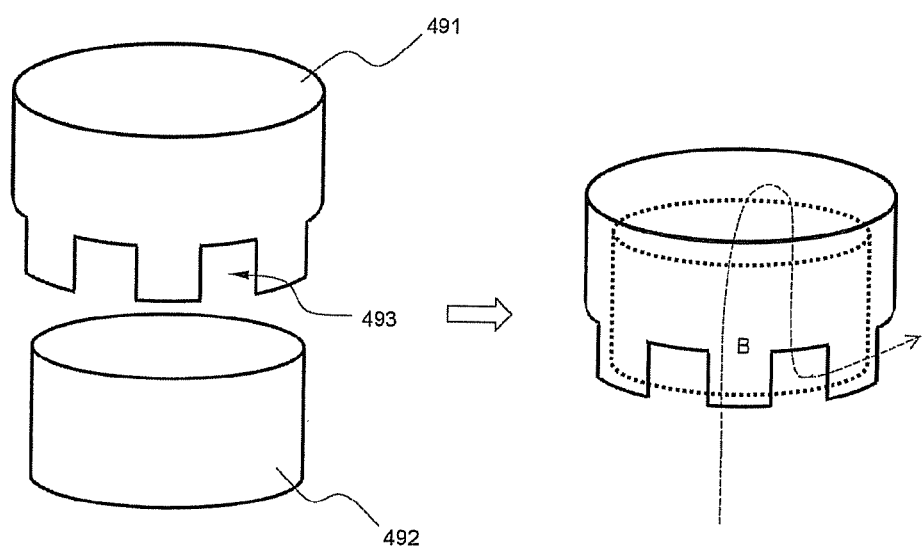
FIGS. 9 to 11 are perspective views illustrating various modifications of a bubble cap mounted in the water controller system shown in FIG. 8.
Figure 10:
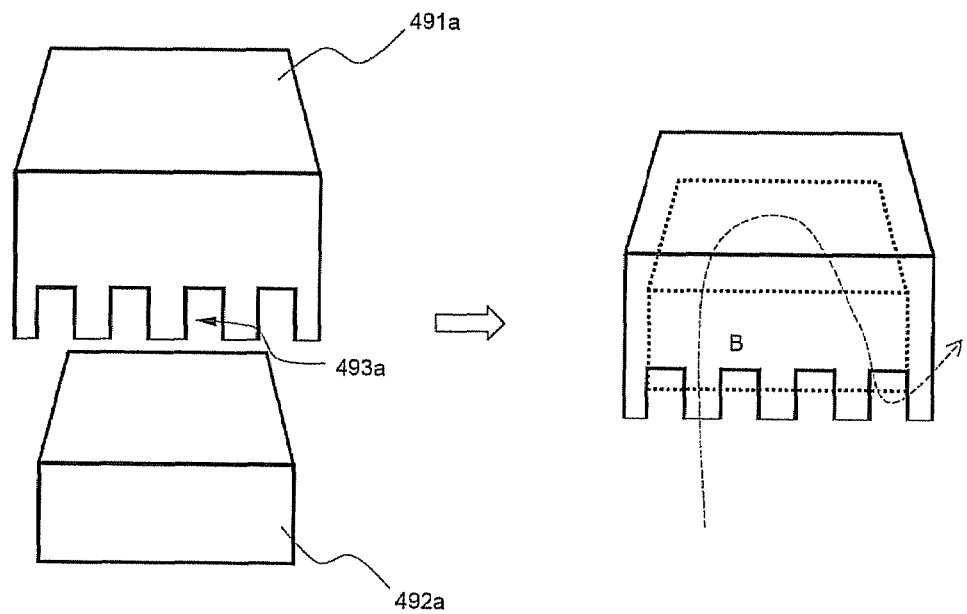
Figure 11:
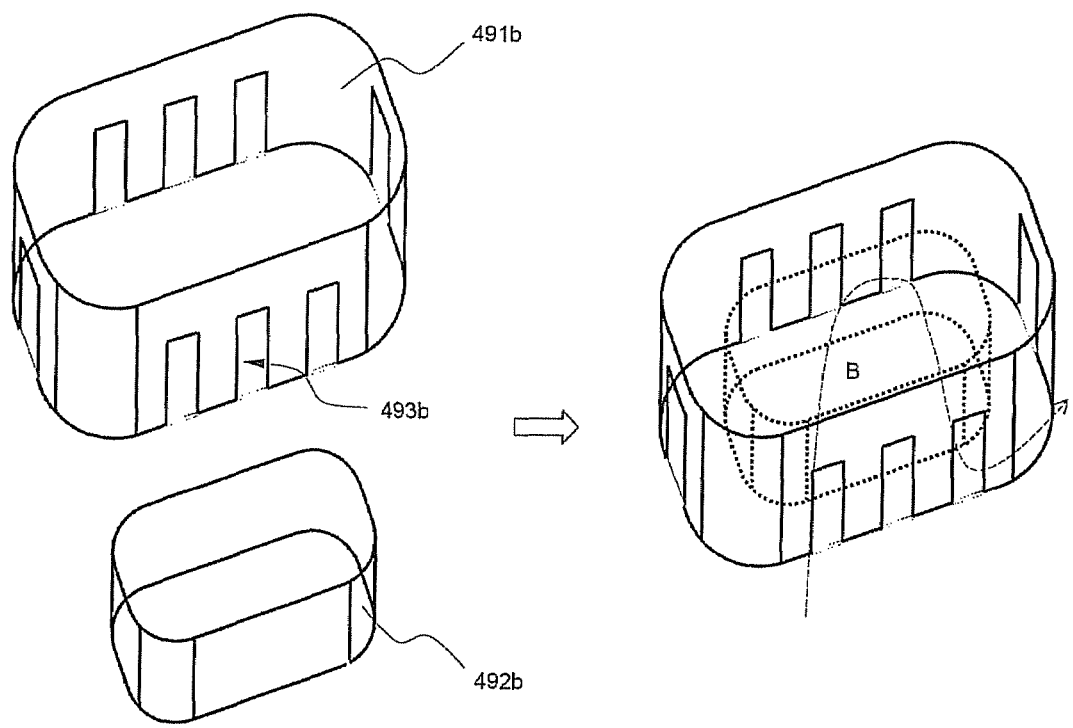

FIGS. 9 to 11 are perspective views illustrating various modifications of the bubble cap 490 mounted in the water controller system 400 shown in FIG. 8.

Referring to these drawings, the bubble cap 490; 490a; 490b is identical in construction to the bubble cap 390; 390a; 390b shown in FIGS. 5 to 7 in that the bubble cap 490; 490a; 490b includes a hollow member 491; 491a; 491b and a cap member 492; 492a; 492b. However, a plurality of grooves 493; 493a; 493b are formed at the lower end of the cap member 492; 492a; 492b, not the hollow member 491; 491a; 491b, and the cap member 492; 492a; 492b has horizontal sectional area and length greater than those of the hollow member 491; 491a; 491b. Consequently, when the cap member 492; 492a; 492b covers the upper end of the hollow member 491; 491a; 491b, a gap is defined between the cap member 492; 492a; 492b and the hollow member 491; 491a; 491b.

In the above-described coupling structure, the inner surface of the cap member 492; 492a; 492b is spaced apart from the hollow member 491; 491a; 491b, and the grooves 493; 493a; 493b formed at the lower end of the cap member 492; 492a; 492b provide passages defined between the grooves 493; 493a; 493b and a partition (not shown). Consequently, unreacted methanol gas moves upward along the middle passage of the hollow member 491; 491a; 491b, moves downward through the gap defined between the cap member 492; 492a; 492b and the hollow member 491; 491a; 491b due to the cap member 492; 492a; 492b, and is discharged through the grooves 493; 493a; 493b formed at the lower end of the cap member 492; 492a; 492b. As a result, when the unreacted methanol passes through the water in the bubble cap 490; 490a; 490b, most of the unreacted methanol is absorbed into the water, and only carbon dioxide passes through the bubble cap 490; 490a; 490b.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the water controller system for fuel cells according to the present invention has the effects of reusing water and an unreacted methanol solution discharged from the fuel cell, minimizing the amount of methanol evaporated and discharged, and accurately controlling the water level of the water controller.

What is claimed is:

1. A water controller system constructed such that water generated from a cathode of a direct methanol fuel cell system and carbon dioxide and an unreacted methanol solution generated from an anode of the direct methanol fuel cell system are introduced into the water controller system, the carbon dioxide is discharged out of the water controller system, and the methanol solution is circulated to the corresponding electrode so as to reuse the methanol solution, wherein the water controller system comprises:

a water inlet port, through which the water from the cathode is introduced into the water controller system, mounted at the upper part of the water controller system;

a gas/solution inlet port, through which the carbon dioxide and the unreacted methanol solution generated from the anode are introduced into the water controller system, mounted below the water inlet port;

a carbon dioxide outlet port mounted above the water inlet port;

at least one methanol collecting unit, which is constructed such that, when a gas-phase ingredient, among ingredients introduced into the water controller system through the gas/solution inlet port, moves upward, the gas-phase ingredient passes through the water introduced into the water controller system through the water inlet port, mounted in a space defined between the water inlet port and the gas/solution inlet port, whereby the gas-phase methanol is prevented from being discharged out of the water controller system through the carbon dioxide outlet port, and a funnel-shaped condenser mounted below the carbon dioxide outlet port for condensing the evaporated water and the carbon dioxide passes through the funnel shaped condenser to the carbon dioxide outlet port, wherein the carbon dioxide outlet port is mounted at the upper end of the water controller system.

2. The water controller system according to claim 1, wherein the methanol collecting unit comprises:

a upper open type water sump mounted to one side of the inner wall of the water controller system; and a partition extending from the other side of the inner wall of the water controller system to the inside of the water sump while the partition seals the inner space of the water controller system, one end of the partition, which extends to the inside of the water sump, being submerged in water filled in the water sump.

3. The water controller system according to claim 2, wherein the partition is inclined toward the water sump.

4. The water controller system according to claim 1, wherein the at least one methanol collecting unit comprises two or more methanol collecting units.

5. The water controller system according to claim 2, further comprising:

one or more bubble caps mounted at the partition.

6. The water controller system according to claim 5, wherein each of the bubble caps comprises:

a hollow member extending upward through the partition, the hollow member having a plurality of grooves formed at the upper end thereof; and a cap member mounted to the upper part of the hollow member, and wherein a gap is defined between the hollow member and the cap member, and the lower end of the cap member is submerged in the water filled to a predetermined water level at the outside of the hollow member while the lower end of the cap member is not in contact with the partition.

7. The water controller system according to claim 5, wherein each of the bubble caps comprises:

a hollow member extending upward through the partition; and a cap member mounted to the upper part of the hollow member, the cap member having a plurality of grooves formed at the lower end thereof, and wherein the cap member has a height greater than that of the hollow member, and a gap is defined between the hollow member and the cap member.

8. The water controller system according to claim 6, wherein the hollow member and the cap member are constructed in the horizontal sectional shape of a circle, a rectangle, or an ellipse.

9. The water controller system according to claim 1, wherein the condenser is provided at the lower end of a funnel-shaped inclined surface thereof, specifically, an inclined surface thereof facing the water inlet port, with a plurality of protrusions, which increase the contact interface area.

10. The water controller system according to claim 1, further comprising:

a phase separating membrane mounted at an inlet port of the condenser for allowing only the gas-phase ingredient to pass therethrough.

11. The water controller system according to claim 1, further comprising:

a water level sensor for measuring the water level of a mixed water and methanol solution in the water controller system, the water level sensor being mounted in a sealing unit constructed in a structure in which the sealing unit is generally sealed except openings formed at the upper and lower ends of the sealing unit, and the upper end opening protrudes from the mixed solution while the lower end opening is submerged in the mixed solution during the operation of the water controller system.

12. A fuel cell system including the water controller system according to claim 1.

* * * * *

UNITED STATES PATENT AND TRADEMARK OFFICE
CERTIFICATE OF CORRECTION

PATENT NO.        : 7,611,794 B2
APPLICATION NO. : 11/538188
DATED             : November 3, 2009
INVENTOR(S)       : Noh et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 566 days.

Signed and Sealed this

Twelfth Day of October, 2010

David J. Kappos
*Director of the United States Patent and Trademark Office*